United States Patent
Rodriguez et al.

(10) Patent No.: US 6,718,112 B1
(45) Date of Patent: Apr. 6, 2004

(54) FIBER OPTIC CABLE CLIP

(75) Inventors: Lou Rodriguez, Savage, MD (US); David B. Harris, Columbia, MD (US)

(73) Assignee: Ciena Corporation, Linthicum, MD (US)

( * ) Notice: Subject to any disclaimer, the term of this patent is extended or adjusted under 35 U.S.C. 154(b) by 0 days.

(21) Appl. No.: 10/272,587

(22) Filed: Oct. 15, 2002

(51) Int. Cl.[7] .................................................. G02B 6/00
(52) U.S. Cl. .................... 385/137; 385/136; 385/100; 385/53
(58) Field of Search ......................... 385/137, 136, 385/134, 114, 53, 14, 100

(56) References Cited

U.S. PATENT DOCUMENTS

| | | | | |
|---|---|---|---|---|
| 6,005,195 A | * | 12/1999 | Kam | 174/135 |
| 6,215,942 B1 | * | 4/2001 | DeMeritt et al. | 385/136 |
| 6,278,830 B1 | * | 8/2001 | Levesque et al. | 385/136 |
| 6,409,392 B1 | * | 6/2002 | Lampert et al. | 385/56 |
| 6,456,775 B1 | * | 9/2002 | Johnson et al. | 385/140 |
| 6,516,130 B1 | * | 2/2003 | Jang | 385/136 |
| 6,588,939 B2 | * | 7/2003 | Lee | 385/58 |
| 6,608,959 B2 | * | 8/2003 | Jang et al. | 385/136 |
| 6,625,372 B1 | * | 9/2003 | Flanders et al. | 385/134 |
| 2002/0068481 A1 | * | 6/2002 | Flickinger et al. | 439/607 |
| 2002/0072274 A1 | * | 6/2002 | Flickinger et al. | 439/607 |
| 2002/0146231 A1 | * | 10/2002 | Johnson et al. | 385/140 |
| 2003/0044122 A1 | * | 3/2003 | Lee | 385/58 |

* cited by examiner

*Primary Examiner*—Brian Healy
(74) *Attorney, Agent, or Firm*—Michael R. Cammarata; James M. Olsen

(57) ABSTRACT

Disclosed herein are fiber optic cable clips for securing and routing fiber optic cables on a printed circuit board (PCB) or other component used in the communications field. One fiber optic cable clip includes a U-shaped body connected to attachment legs that permanently connect to the PCB. The U-shaped body defines a containment area for receiving and retaining fiber optic cables. The U-shaped body also includes spring-loaded arms or pads that flex open to permit entrance of the fiber optic cables into the containment area, and flex close to retain the cables therein. The fiber optic cable clips retain multiple cables, are easy to use, and do not damage the cables when installing the cables within the clip. If the fiber optic cables are pulled when contained within the clip, the fiber optic cable clips will flex and release the cable before the cables are damaged. The attachment legs permanently connect to the PCB by soldering them to a metallic pad provided on the PCB using surface mount technology (SMT) techniques, which reduces processing time and costs, and prevents, additional potentially damaging PCB processing steps.

14 Claims, 2 Drawing Sheets

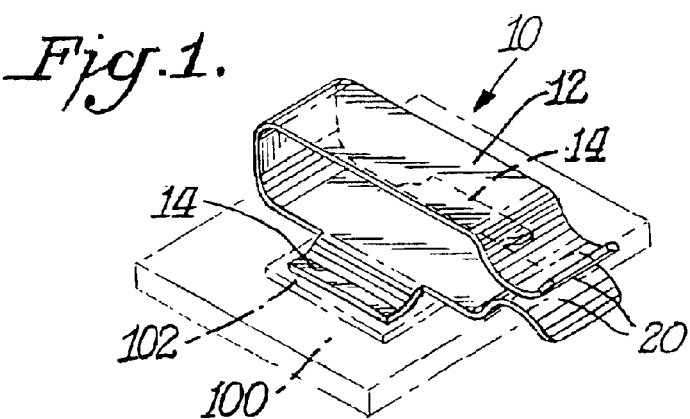
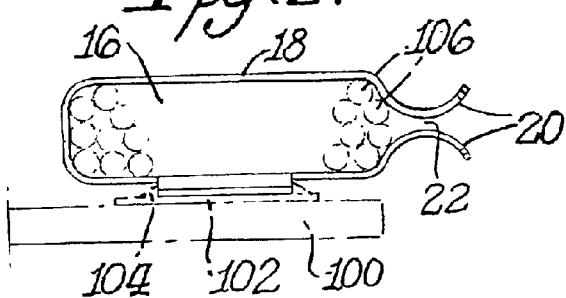
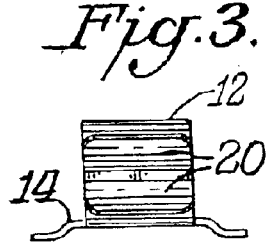
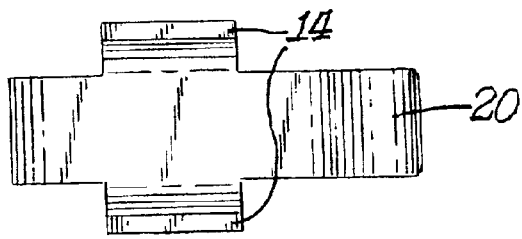
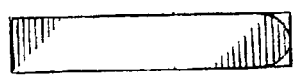
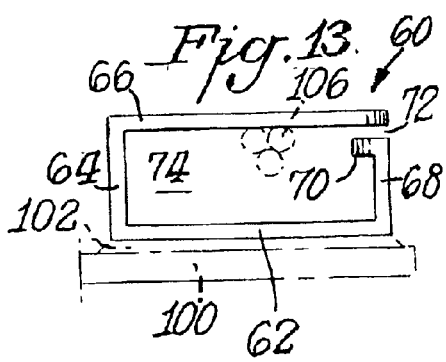

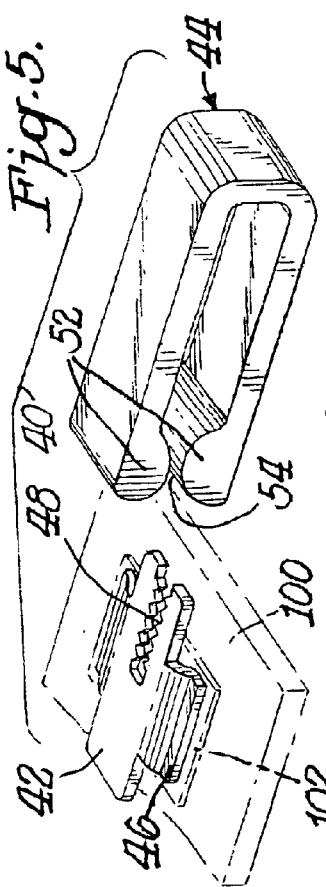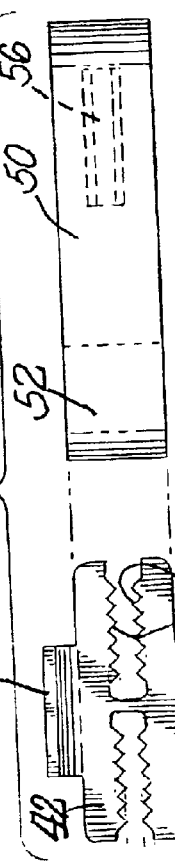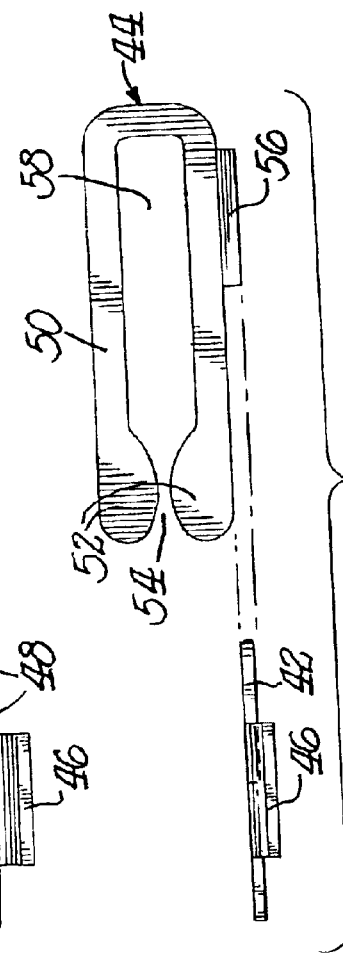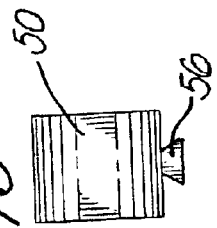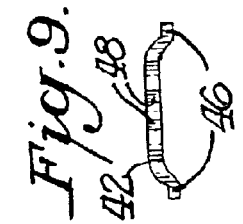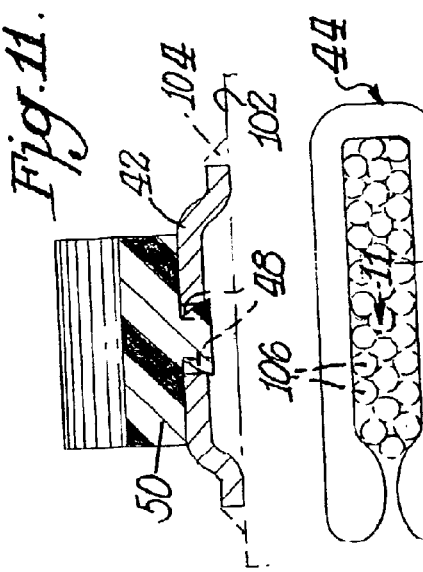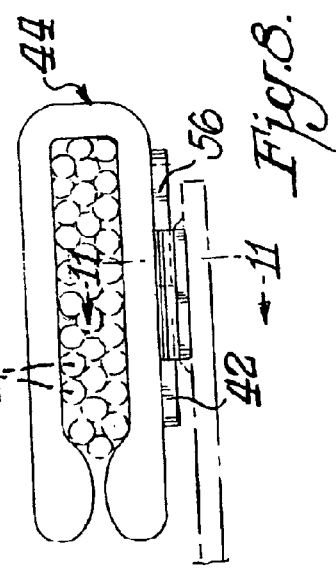

FIBER OPTIC CABLE CLIP

BACKGROUND OF THE INVENTION

A. Field of the Invention

The present invention relates generally to the communications field, and, more particularly to a clip for securing and routing fiber optic cables on a printed circuit board (PCB) or other component used in the communications field.

B. Description of the Related Art

Presently, it is a problem in the field of communication cable installation to ensure the precise placement of the communication cable without the possibility of damage to the communication cable by the provision of tight bends, or inappropriate use of fasteners, or inadequate support to the communication cable. Such communication cables include conventional telephone cable having a plurality of copper conductors, coaxial cable, optical fiber, or the like. In all of these applications, the minimum radius of curvature of the communication cable is well defined, and bending the communication cable in a tighter bend can cause damage to the communication medium housed within the cable. The installer of communication cable is thus faced with the problem of routing the communication cable over surfaces, which typically include sharp bends, without over bending the communication cable, yet also securing the communication cable to these surfaces in a manner to ensure protection from damage.

This problem is further heightened when fiber optic cables are used. Glass fibers used in such cables are easily damaged when bent too sharply and require a minimum bend radius to operate within required performance specifications. The minimum bend radius of a fiber optic cable depends upon a variety of factors, including the signal handled by the fiber optic cable, the style of the fiber optic cable, and equipment to which to fiber optic cable is connected. For example, some fiber optic cables used for internal routing have a minimum bend radius of 0.75 inches, and some fiber optic cables used for external routing have a minimum bend radius of 1.0 inches.

Damaged fiber optic cables may lead to a reduction in the signal transmission quality of the cables. Accordingly, fiber optic cables are evaluated to determine their minimum bend radius. As long as a fiber optic cable is bent at a radius that is equal to or greater than the minimum bend radius, there should be no reduction in the transmission quality of the cable. If a fiber optic cable is bent at a radius below the minimum bend radius determined for such cable, there is a potential for a reduction in signal transmission quality through the bend. The greater a fiber optic cable is bent below its minimum bend radius, the greater the potential for breaking the fibers contained in the cable, and the shorter the life span of the cable.

Furthermore, the recent increase in bandwidth requirements for telecommunications systems has resulted in more densely packed equipment and fiber optic cables than prior systems. Many carriers or other consumers of optical communications equipment have a very limited floor space in which to place new equipment and fiber optic cables. For example, some carriers may only have a single open bay (or shelf) in which to place new equipment and fiber optic cables. If the communications equipment can be more densely packed, then a greater amount of equipment and fiber optic cables may be placed within the available space. Thus, it is even more necessary now to be able to bend fiber optic cables around corners and other obstacles in order to route the cables to and from equipment such as computers, connector panels, junction boxes, etc.

For example, in a telephone switching office, the various switching components are split onto different printed circuit boards (PCBs). Fiber optic cables may be used to route the signals between the different PCBs or between components on a single PCB. In a conventional arrangement, the PCB is generally placed in a shelf or rack alongside other such PCBs.

The fiber optic cables are used for transferring signals between reception ports and electro-optical converters provided on the PCB or PCBs. The fiber optic cables generally come in three and six foot lengths with connectors provided at the ends thereof However, the PCB may have a width of only several inches. To accommodate for the extra length of the fiber optic cables, such cables are routed around and secured to the PCB via a plurality of clips. The clips are secured to the PCB via holes drilled through the PCB, adhesive, or fasteners.

The fiber optic cables are generally routed, by hand, through the clips, without bending the fiber optic cables beyond the minimum bend radius. Whether this requirement is satisfied depends on the individual operator doing the assembly. The fiber optic cables ideally should be routed in to prevent stress being applied to the cables.

PCB assemblies are used in computers, communications equipment, televisions, and many other products. In a typical PCB assembly, many electrical components are attached to the top and bottom surfaces of a PCB. Since the electronics manufacturing industry is highly competitive, it is important to maximize the throughput of processing PCB assemblies and to securely attach functional electrical components to the PCBs.

The manufacturing of PCB assemblies involves many processes, one of which is surface mounting components to PCBs. In addition to maximizing the throughput of processing PCB assemblies, it is also becoming important to accurately mount a large number of very small components to one side of the PCB assemblies.

As disclosed in U.S. Pat. No. 6,426,880, the disclosure of which being incorporated herein by reference except where inconsistent with the present invention, surface mount technology (SMT) is a construction technique for electronic device assemblies in which the terminals of electronic devices are attached to the surface of a PCB, by solder or some other conductive adhesive. In SMT, the device terminals each have a flat (planar) contact surface that rests on corresponding conductive "landing pads" on the PCB surface. SMT may be distinguished from other construction techniques which generally employ "through pin" terminals on their electronic device packages. In these other construction techniques, the device terminals are pins which are placed in holes passing through the circuit board and sealed there by solder or some other conductive adhesive.

SMT fabrication permits components to be mounted to both sides of the PCB. As such, a primary advantage which SMT provides over "through pin" construction techniques is the increased packing density, i.e., the number of components on the PCB per unit of area, which may be achieved by mounting electronic devices on both sides of the PCB. In the "through pin" techniques, the terminal physically passes through a hole in the board, thereby providing a strong, shock resistant mechanical coupling to the board. In SMT, the terminals are physically coupled to the board only by conductive adhesive.

Conventional fiber optic cable clips or retention devices are problematic for at least three reasons. First, current clips require performance of secondary operations on the PCB, in addition to the SMT mounting of components on the PCB. Such secondary operations increase the risk of damage to the PCB. Second, the through holes, adhesives, and fasteners used to attach clips to the PCB also increase the chance of damage to the PCB. For example, forcing such clips onto PCBs could potentially warp or bend the PCB, which creates circuit trace damage to the PCB. Third, clips attached to PCBs via through holes tend to rotate in the holes, increasing the risk of damage to the fiber optic cables retained in the clips.

Thus, there is a need in the art to provide an inexpensive mechanism for securing and routing multiple fiber optic cables in the denser optical communications systems that may be easily customized by an operator and prevent the fiber optic cables from being damaged or bent beyond their minimum bend radii, and utilize existing PCB SMT techniques.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is a perspective view of a fiber optic cable clip mounted to a PCB in accordance with an embodiment of the present invention;

FIG. 2 is a side elevational view of the fiber optic cable clip shown in FIG. 1 mounted to a PCB and holding fiber optic cables;

FIG. 3 is a front elevational view of the fiber optic cable clip shown in FIGS. 1 and 2;

FIG. 4 is a bottom plan view of the fiber optic cable clip shown in FIGS. 1–3;

FIG. 5 is a perspective exploded view of a fiber optic cable clip mounted to a PCB in accordance with another embodiment of the present invention;

FIG. 6 is an exploded top plan view of a fiber optic cable clip shown in FIG. 5;

FIG. 7 is an exploded side elevational view of the fiber optic cable clip shown in FIGS. 5 and 6;

FIG. 8 is a side elevational view of the fiber optic cable clip shown in FIGS. 5–7;

FIG. 9 is a front elevational view of the base plate of fiber optic cable clip shown in FIGS. 5–8;

FIG. 10 is a rear elevational view of the clip portion of the fiber optic cable clip shown in FIGS. 5–8;

FIG. 11 is a cross-sectional view in elevation of the fiber optic cable clip shown in FIGS. 5–8, taken along line 11—11 of FIG. 8;

FIG. 12 is a top plan view of a fiber optic cable clip in accordance with still another embodiment of the present invention; and FIG. 13 is a side elevational view of the fiber optic cable clip shown in FIG. 12 mounted to a PCB.

DETAILED DESCRIPTION OF EMBODIMENTS OF THE PRESENT INVENTION

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

The present invention solves the problems of the related art by providing a fiber optic cable clip for securing and routing fiber optic cables on a printed circuit board (PCB) or other component used in the communications field. The fiber optic cable clip retains multiple cables, is easy to use, and does not damage the cables when installing the cables within the clip. If the fiber optic cables are pulled when contained within the clip, the fiber optic cable clip will flex and release the cable before the cables are damaged.

In addition to fiber optic cables, the clip of the present invention may also route and retain electrical wires and/or tubes on a PCB. Preferably, the fiber optic cable clip is mounted to the PCB using conventional SMT techniques, which reduces processing time and costs, and prevents additional potentially damaging PCB processing steps. Furthermore, since the fiber optic cable clip is not mounted to the PCB through a hole, the clip does not rotate, eliminating the potential twisting and damaging of fiber optic cables.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description. It is to be understood that the following detailed description is exemplary and explanatory only and is not restrictive of the invention, as claimed.

Referring now specifically to the drawings, one embodiment of the fiber optic cable clip of the present invention is illustrated in FIGS. 1–4, and shown generally as reference numeral 10. Fiber optic cable clip 10 includes a body portion 12 connected to attachment legs 14, the body portion 12 having a containment area 16 for receiving and retaining fiber optic cables. Attachment legs 14 may be separate components from body portion 12, but preferably, body portion 12 and attachment legs 14 are all integrally formed.

Fiber optic cable clip 10 may be formed from numerous materials, but preferably is formed from a resilient material that permits body portion 12 to flex open and return back to its original shape. Such resilient materials may include, for example, a rubber (natural or synthetic) material, a soft plastic material, or a recycled soft plastic material. A low durometer hardness nylon material may also be used for clip 10. Preferably, a spring steel or beryllium copper material or other material having a similar spring coefficient is used for clip 10 due to their durability and ruggedness.

The body portion 12 of fiber optic cable clip 10 may have a variety of geometric configurations. Body portion 12 includes a U-shaped section 18, and a pair of spring-loaded arms 20. U-shaped section 18 defines containment area 16 that holds fiber optic cables therein. Spring-loaded arms 20 are spaced from each other by a distance approximately less than or equal to the diameter of the smallest fiber optic cable to be retained in clip 10. This spacing defines an opening 22 between arms 20.

As best shown in FIG. 2, opening 22 provides an entrance for fiber optic cables 106 into containment area 16 of clip 10, and retains fiber optic cables 106 within containment area 16. Fiber optic cables 106 enter opening 22 and flex spring-loaded, opposed arms 20 away from each other until fiber optic cables 106 are within containment area 16. Arms 20 will then return to their normal positions, retaining fiber optic cables 106 within clip 10. The spring coefficient of arms 20 depends upon the thickness and type of material used to form body portion 12 of clip 10.

The dimensions of body portion 12 may vary depending upon the desired number of fiber optic cables 106 to be routed therethrough, as well as the types of fiber optic cables 106. For example, only a few large diameter fiber optic cables may be provided within body portion 12 of clip 10, whereas more smaller diameter fiber optic cables may be provided within the same body portion 12.

Clip 10 may be provided at various locations of a communications component such as a printed circuit board (PCB) 100. Preferably, clip 10 permanently attaches at various locations of PCB 100 by soldering (with solder 104) attachment legs 14 to a metallic pad 102 provided on PCB 100, using conventional SMT techniques as disclosed in U.S. Pat. No. 6,426,880, discussed above. Furthermore, clip 10 may permanently attach to PCB 100 using other SMT attachment means, such as, adhesives (e.g., glue), etc. Attachment of clip 10 with conventional SMT techniques reduces PCB processing time and costs, and prevents additional potentially damaging PCB processing steps.

Another embodiment of the fiber optic cable clip of the present invention is illustrated in FIGS. 5–11, and shown generally as reference numeral 40. FIG. 5 shows a clip 40 capable of mounting in one direction, whereas FIG. 6 shows a clip capable of attaching in two directions. Clip 40 generally includes a base plate 42 and a body 44. As best shown in FIG. 6, base plate 42 includes attachment legs 46, and serrated teeth openings 48 provided therein. Base plate 42 may be provided at various locations of a communications component such as a PCB 100. Preferably, base plate 42 permanently attaches at various locations of PCB 100 by soldering (with solder 104) attachment legs 46 to a metallic pad 102 provided on PCB 100, using conventional SMT techniques as disclosed in U.S. Pat. No. 6,426,880, discussed above. Furthermore, base plate 42 may permanently attach to PCB 100 using other SMT attachment means, such as, adhesives (e.g., glue), etc. Attachment of base plate 42 with conventional SMT techniques reduces PCB processing time and costs, and prevents additional potentially damaging PCB processing steps.

Base plate 42 may be made from a variety of materials, but preferable is made from a metallic material so that it may soldered to metallic pad 102 of PCB 100.

Body 44 of fiber optic cable clip 40 may have a variety of geometric configurations. Body 44 includes a U-shaped section 50, a pair of spring-loaded, opposed arms or pads 52, and a dovetail section 56, all preferably integrally connected. U-shaped section 50 defines a containment area 58 that holds fiber optic cables therein. Spring-loaded arms 52 are spaced from each other by a distance approximately less than or equal to the diameter of the smallest fiber optic cable to be retained in clip 40. This spacing defines an opening 54 between arms 52, as shown in FIG. 7.

As best shown in FIG. 8, opening 54 provides an entrance for fiber optic cables 106 into containment area 58 of body 44, and retains fiber optic cables 106 within containment area 58. Fiber optic cables 106 enter opening 54 and flex spring-loaded arms 52 away from each other until fiber optic cables 106 are within containment area 58. Arms 52 will then return to their normal position, retaining fiber optic cables 106 within clip 40. The spring coefficient of arms 52 depends upon the thickness and type of material used to form body 44 of clip 40.

The dimensions of body 44 may vary depending upon the desired number of fiber optic cables 106 to be routed therethrough, as well as the types of fiber optic cables 106. For example, only a few large diameter fiber optic cables may be provided within body 44 of clip 40, whereas more smaller diameter fiber optic cables may be provided within the same body 44.

Body 44 of fiber optic cable clip 40 may be formed from numerous materials, but preferably is formed from a resilient material that permits body 44 to flex open and return back to its original shape. Such resilient materials may include, for example, a rubber (natural or synthetic) material, a soft plastic material, a recycled soft plastic material, a low durometer hardness nylon material, etc. A spring steel or beryllium copper material or other material having a similar spring coefficient may also be used for body 44.

Body 44 of fiber optic cable clip 40 detachably connects to base plate 42 by sliding dovetail section 56 into one of the serrated teeth openings 48 provided in base plate 42. The serrated teeth of opening 48 engage and retain dovetail section 56 of body 44. Thus, opening 54 of body 44 may be provided in opposite directions, depending upon the desired orientation of fiber optic cable clip 40. FIGS. 5–6 show body 44 and base plate 42 in their detached positions, while FIGS. 8 and 11 show body 44 and base plate 42 in their attached positions.

Although FIGS. 5–11 show body 44 being attached to base plate 42 via serrated teeth opening 48, body 44 may also attach to base plate 42 using a variety of fastening techniques, such as, for example, adhesives, snap fits, mechanical hardware, etc.

Before securing fiber optic cables 106 within clip 10, 40, a user will preferably mount attachment legs 14, 46 on PCB 100, and then, in the case of clip 40, connect body 44 to base plate 42. Once fiber optic cable clip 10, 40 is mounted in PCB 100, the user feeds fiber optic cables 106 into openings 22, 54 of clips 10, 40, where they are retained in containment areas 16, 58 of clips 10, 40.

Still another embodiment of the fiber optic cable clip of the present invention is illustrated in FIGS. 12 and 13, and shown generally as reference numeral 60. Fiber optic cable clip 60 includes a body having a bottom portion 62, a first side portion 64, a top portion 66, and a second side portion 68 that form a containment area 74 for receiving and retaining fiber optic cables. Bottom portion 62, first side portion 64, top portion 66, and second side portion 68 may be separate components, but preferably, are all integrally formed. First side portion 64 connects an end of top portion 66 to an end of bottom portion 62.

Second side portion 68 connects to another end of bottom portion 62 and is spaced from top portion 66 by a distance approximately less than or equal to the diameter of the smallest fiber optic cable to be retained in clip 60, forming an opening 72 between top portion 66 and second side portion 68. Second side portion 68 also includes an extension 70 connected to an end of second side portion 68, away from the end connected to bottom portion 62. Extension 70 extends toward first side portion 64 in a direction substantially parallel to top and bottom portions 66, 62.

Fiber optic cable clip 60 may be formed from numerous materials, but preferably is formed from a resilient material that permits clip 60 to flex open and return back to its original shape. Such resilient materials may include, for example, a rubber (natural or synthetic) material, a soft plastic material, or a recycled soft plastic material. A low durometer hardness nylon material may also be used for clip 60. Preferably, a spring steel or beryllium copper material or other material having a similar spring coefficient is used for clip 10 due to their durability and ruggedness.

As best shown in FIG. 13, opening 72 provides an entrance for fiber optic cables 106 into containment area 74 of clip 60, and retains fiber optic cables 106 within containment area 74. Fiber optic cables 106 enter opening 72 and flex top portion 66 and second side portion 68 until fiber optic cables 106 are within containment area 74. Top portion 66 and second side portion 68 will then return to their normal positions, retaining fiber optic cables 106 within clip 60. The spring coefficient of top and second side portions 66, 68 depends upon the thickness and type of material used to form the body of clip 60.

The dimensions of clip 60 may vary depending upon the desired number of fiber optic cables 106 to be routed therethrough, as well as the types of fiber optic cables 106. For example, only a few large diameter fiber optic cables may be provided within clip 60, whereas more smaller diameter fiber optic cables may be provided within the same clip 60.

Clip 60 may be provided at various locations of a communications component such as a printed circuit board (PCB) 100. Preferably, clip 60 permanently attaches at various locations of PCB 100 by soldering (with solder 104) bottom portion 62 to a metallic pad 102 provided on PCB 100, using conventional SMT techniques as disclosed in U.S. Pat. No. 6,426,880, discussed above. Furthermore, clip 60 may permanently attach to PCB 100 using other SMT attachment means, such as, adhesives (e.g., glue), etc. Attachment of clip 60 with conventional SMT techniques reduces PCB processing time and costs, and prevents additional potentially damaging PCB processing steps.

The fiber optic cable clip of the present invention provides many advantages over the conventional clips previously described. For example, the clip of the present invention is easy to use since it is self-closing when a user ceases flexure of the body portion. Furthermore, the clip of the present invention is preferably soft and flexible so it does not damage the fiber optic cable. If the fiber optic cables are pulled when contained within the clip, the fiber optic cable clip will flex and release the cable before the cables are damaged.

In addition, the fiber optic cable clip of the present invention preferably mounts to the PCB using conventional SMT techniques, which reduces processing time and costs, and prevents additional potentially damaging PCB processing steps. Furthermore, since the fiber optic cable clip of the present invention is not mounted to the PCB through a hole, the clip does not rotate, eliminating the potential twisting and damaging of fiber optic cables.

It will be apparent to those skilled in the art that various modifications and variations can be made in the fiber optic cable clip of the present invention and in construction of the clip without departing from the scope or spirit of the invention. The physical dimensions, shapes, material selections, etc., discussed above and shown in the Figs., are purely exemplary and not limiting of the embodiments of the present invention. Furthermore, the present invention is not limited to use with fiber optic cables, and may be used with any cable, such as, for example, telephone cable having a plurality of copper conductors, coaxial cable, tubing, or the like.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A fiber optic cable clip for receiving and retaining fiber optic cables on a printed circuit board comprising:
   a body having a pair of spring-loaded arms and shaped to define a containment area that holds the fiber optic cables therein, the spring-loaded arms being spaced from each other by a distance approximately less than or equal to the diameter of the smallest fiber optic cable to be retained in the fiber optic cable clip; and
   attachment legs connected to said body and soldered to a metallic pad provided on the printed circuit board using surface mount technology.

2. A fiber optic cable clip as recited in claim 1, wherein said body further comprises a U-shaped section and a dovetail section integrally joined together with the pair of spring-loaded arms.

3. A fiber optic cable clip as recited in claim 2, wherein said attachment legs connect to a base plate having a serrated teeth opening provided therein, the serrated teeth opening receiving and retaining the dovetail section of said body.

4. A fiber optic cable clip as recited in claim 3, wherein the base plate and said attachment legs comprise a metallic material.

5. A fiber optic cable clip as recited in claim 1, wherein said attachment legs comprise a pair of attachment legs.

6. A fiber optic cable clip as recited in claim 1, wherein said body is formed from a resilient material that permits the spring-loaded arms to flex open when receiving the fiber optic cables and return back to their original shape.

7. A fiber optic cable clip as recited in claim 6, wherein said body is formed from one of a natural or synthetic rubber material, a soft plastic material, a recycled soft plastic material, or a low durometer hardness nylon material.

8. A fiber optic cable clip as recited in claim 6, wherein said body is formed from one of a spring steel or beryllium copper material.

9. A fiber optic cable clip as recited in claim 1, said body further comprises a U-shaped section integrally joined together with the pair of spring-loaded arms.

10. A fiber optic cable clip as recited in claim 9, wherein said attachment legs are integrally formed with the U-shaped section of said body.

11. A fiber optic cable clip for receiving and retaining fiber optic cables on a printed circuit board comprising:
    a body having a top portion, a first side portion, a bottom portion, and a second side portion integrally formed together, wherein:
    the first side portion connects an end of the top portion to an end of the bottom portion;
    the second side portion connects to another end of the bottom portion and is spaced from the top portion by a distance approximately less than or equal to the diameter of the smallest fiber optic cable to be retained in the fiber optic cable clip; and
    the bottom portion is soldered to a metallic pad provided on the printed circuit board using surface mount technology.

12. A fiber optic cable clip as recited in claim 11, wherein the second side portion includes an extension connected to an end of the second side portion and extending toward the first side portion in a direction substantially parallel to the top and bottom portions.

13. A fiber optic cable clip as recited in claim 11, wherein said body is formed from a resilient material that permits the body to flex open when receiving the fiber optic cables and return back to its original shape.

14. A fiber optic cable clip as recited in claim 13, wherein said body is formed from one of a spring steel or beryllium copper material.

* * * * *